United States Patent
Irie

(10) Patent No.: US 9,678,303 B2
(45) Date of Patent: Jun. 13, 2017

(54) IMAGING DEVICE AND FOCUSING CONTROL METHOD

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/078,759

(22) Filed: Mar. 23, 2016

(65) Prior Publication Data

US 2016/0205315 A1    Jul. 14, 2016

Related U.S. Application Data

(63) Continuation of application No. PCT/JP2014/072198, filed on Aug. 25, 2014.

(30) Foreign Application Priority Data

Sep. 27, 2013  (JP) .................................. 2013-201914

(51) Int. Cl.
    *H04N 5/232*    (2006.01)
    *H04N 5/353*    (2011.01)
    (Continued)

(52) U.S. Cl.
    CPC ................. *G02B 7/28* (2013.01); *G02B 7/34* (2013.01); *G02B 7/36* (2013.01); *H04N 5/23212* (2013.01)

(58) Field of Classification Search
    CPC ... G02B 7/28; G02B 7/34; G02B 7/36; H04N 5/23212; H04N 2201/0084
    (Continued)

(56) References Cited

U.S. PATENT DOCUMENTS

2007/0206937 A1* 9/2007 Kusaka .................. G02B 7/102
                                                                 396/89
2014/0211059 A1* 7/2014 Aoki ........................ G02B 7/34
                                                                 348/311
(Continued)

FOREIGN PATENT DOCUMENTS

JP    2001-275033 A    10/2001
JP    2008-152150 A    7/2008
(Continued)

OTHER PUBLICATIONS

International Search Report issued in PCT/JP2014/072198 dated Dec. 2, 2014.
(Continued)

*Primary Examiner* — Tuan Ho
*Assistant Examiner* — Marly Camargo
(74) *Attorney, Agent, or Firm* — Birch, Stewart, Kolasch & Birch, LLP

(57) ABSTRACT

Provided are an imaging device and a focusing control method capable of preventing a focusing error even in a case where still image capturing is consecutively performed to enhance imaging quality. A digital camera performs a correlation operation of two images captured by a pixel pair P1 after performing an imaging process of an N-th frame, and determines a reliability of a correlation operation result based on the result of the correlation operation. In a case where the reliability is low, the digital camera performs a focusing control based on a contrast AF method in each time of imaging subsequent to an (N+1)-th frame, and in a case where the reliability is low, the digital camera performs a focusing control based on a phase difference AF method in an imaging process of the (N+1)-th frame.

13 Claims, 12 Drawing Sheets

(51) Int. Cl.
  *G02B 7/28* (2006.01)
  *G02B 7/34* (2006.01)
  *G02B 7/36* (2006.01)
(58) Field of Classification Search
  USPC ......... 348/349, 340, 345, 241, 242; 396/104
  See application file for complete search history.

(56) References Cited

U.S. PATENT DOCUMENTS

| | | | |
|---|---|---|---|
| 2015/0085178 A1* | 3/2015 | Aoki | H04N 5/23212 348/349 |
| 2016/0156836 A1* | 6/2016 | Aoki | G02B 7/34 348/345 |
| 2016/0327771 A1* | 11/2016 | Inoue | G02B 7/34 |

FOREIGN PATENT DOCUMENTS

| | | |
|---|---|---|
| JP | 2009-048123 A | 3/2009 |
| JP | 2009-175528 A | 8/2009 |
| JP | 2012-226247 A | 11/2012 |
| JP | 2013-050690 A | 3/2013 |

OTHER PUBLICATIONS

Written Opinion of the International Searching Authority issued in PCT/JP2014/072198 dated Dec. 2, 2014.
English Translation of International Preliminary Report on Patentability (including PCT/IB/373 and PC/ISA/237) for PCT/JP2014/072198, issued on Mar. 29, 2016.

* cited by examiner

IMAGING DEVICE AND FOCUSING CONTROL METHOD

CROSS-REFERENCE TO RELATED APPLICATIONS

This application is a Continuation of PCT International Application No. PCT/JP2014/072198 filed on Aug. 25, 2014, which claims priority under 35 U.S.C §119(a) to Japanese Patent Application No. 2013-201914 filed on Sep. 27, 2013. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to increase in resolution of a solid-state imaging element such as a charge coupled device (CCD) image sensor or a complementary metal oxide semiconductor (CMOS) image sensor, demand for an information device having an imaging function, such as a digital still camera, a digital video camera, a mobile phone such as a smart phone, or a personal digital assistant (PDA) has rapidly increased. The information device having the above-mentioned imaging function is referred to as an imaging device.

In such an imaging device, as a focusing control method of focusing on a main subject, a contrast auto-focus (AF) method or a phase difference AF method is employed. Since each of the contrast AF method and the phase difference AF method has its own advantage, an imaging device that employs these methods together has also been proposed (for example, see JP2012-226247A, JP2009-48123A, and JP2013-50690A).

JP2012-226247A discloses an imaging device that performs, in a case where plural lens positions in which the degree of correlation is highest are found as a result of a correlation operation of output signals of phase difference detection pixels, a contrast AF using information about the plural lens positions and displays a focusing error in a case where a lens position in which the degree of correlation is highest is not found.

SUMMARY OF THE INVENTION

The imaging device disclosed in JP2012-226247A does not consider an operation in a mode where focusing is continuously performed on a main subject during imaging of consecutive still images, as in consecutive photographing, moving image capturing, or the like. In the imaging device provided with this mode, it is typical that the AF method is fixed until the imaging is terminated.

For example, in the method disclosed in JP2012-226247A, if a focusing control based on a phase difference AF method is employed in initial imaging of continuous photographing, there is a case where the phase difference AF cannot be performed in subsequent imaging due to change in an imaging environment or the like. If the AF cannot be performed, consecutiveness of obtained images is damaged, or a moving image is defocused on the way, which lowers imaging quality.

In order to solve the above-mentioned problems, an object of the invention is to provide an imaging device and a focusing control method capable of preventing a focusing error to enhance imaging quality even in a case where a still image is consecutively captured.

According to an aspect of the invention, there is provided an imaging device including an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams. The imaging device includes: a focusing control unit that performs either one of a focusing control based on a phase difference AF method using a result of a correlation operation between a detection signal of the first signal detection unit and a detection signal of the second signal detection unit or a focusing control based on a contrast AF method using contrast of a captured image captured by the imaging element. In a mode where the imaging is consecutively performed by the imaging element a plurality of times, the focusing control unit performs, in a case where a reliability of the focusing control based on the phase difference AF method determined based on the result of the correlation operation between the detection signal of the first signal detection unit and the detection signal of the second signal detection unit read from the imaging element at an arbitrary timing is equal to or lower than a first threshold value, the focusing control based on the contrast AF method as a focusing control in the imaging to be performed after the arbitrary timing.

According to another aspect of the invention, there is provided a focusing control method in an imaging device that includes an imaging element that images a subject through an imaging optical system. The imaging element includes a first signal detection unit that detects a signal based on one beam among a pair of beams that passes through different portions in a pupil region of the imaging optical system, and a second signal detection unit that detects a signal based on the other beam among the pair of beams. The focusing control method includes performing, in a mode where the imaging is consecutively performed by the imaging element a plurality of times, in a case where a reliability of the focusing control based on the phase difference AF method, which uses the result of the correlation operation, determined based on the result of the correlation operation between the detection signal of the first signal detection unit and the detection signal of the second signal detection unit read from the imaging element at an arbitrary timing is equal to or lower than a first threshold value, the focusing control based on the contrast AF method using contrast of a captured image captured by the imaging element as a focusing control in the imaging to be performed after the arbitrary timing.

According to the invention, it is possible to provide an imaging device and a focusing control method capable of preventing a focusing error to enhance imaging quality even in a case where a still image is consecutively captured.

DESCRIPTION OF THE PREFERRED EMBODIMENTS

Hereinafter, embodiments of the invention will be described with reference to the accompanying drawings.

Figure 1:
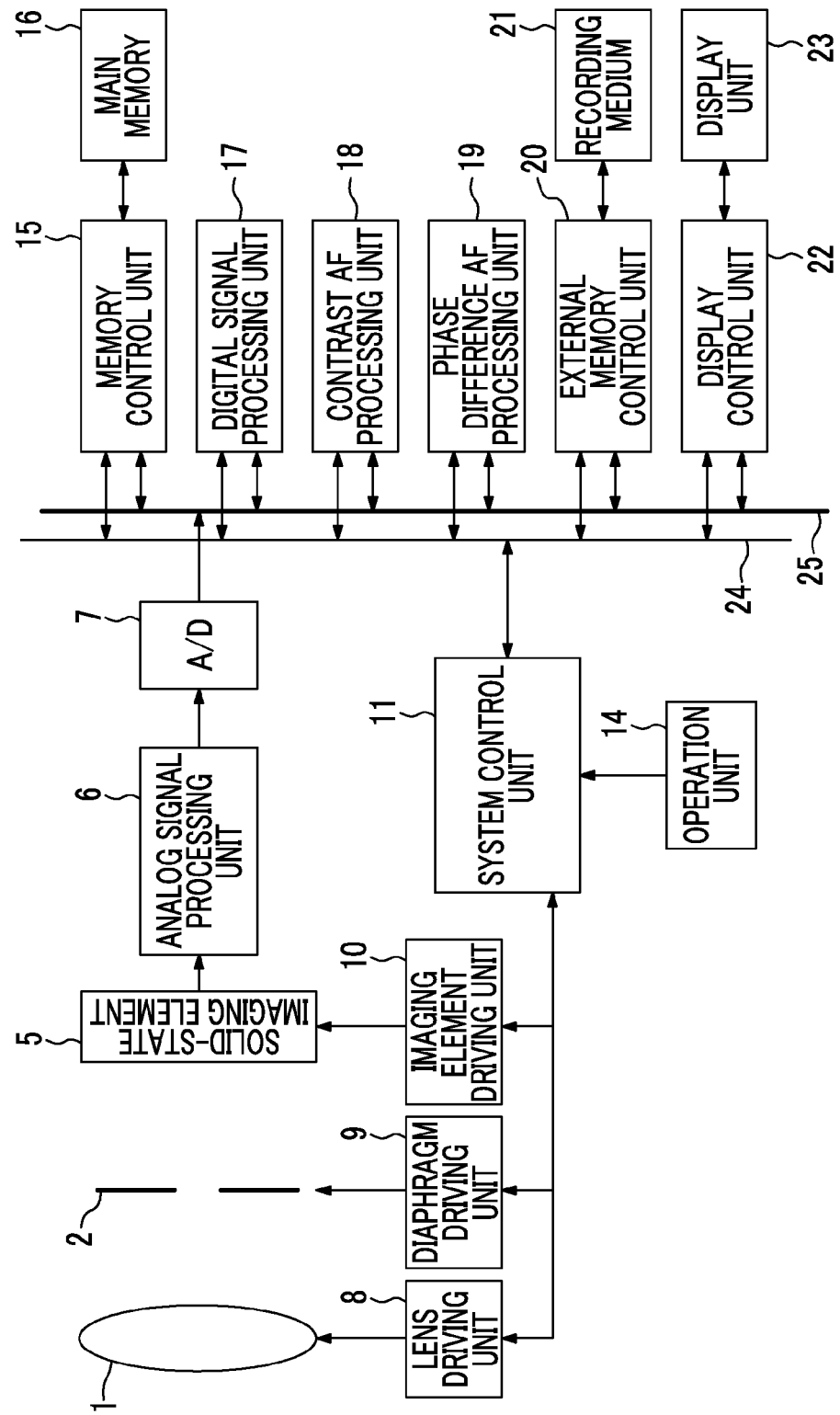
FIG. 1 is a diagram illustrating a schematic configuration of a digital camera which is an example of an imaging device illustrating an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system. The lens device may be detachably or fixedly mounted to a camera main body. It is sufficient if the imaging lens 1 includes at least the focus lens. Further, the imaging lens 1 may be a single focus lens that performs focus adjustment by moving the entirety of the lens system.

The camera main body includes a solid-state imaging element 5 of a CCD type, a CMOS type, or the like that images a subject through the lens device, an analog signal processing unit 6 that is connected to an output end of the solid-state imaging element 5 and performs analog signal processing such as a correlated double sampling process, and an A/D conversion circuit 7 that converts an analog signal output from the analog signal processing unit 6 into a digital signal. The analog signal processing unit 6 and the A/D conversion circuit 7 are controlled by a system control unit 11. The analog signal processing unit 6 and the A/D conversion circuit 7 may be built in the solid-state imaging element 5.

The system control unit 11 that generally controls the entirety of an electric control system of the digital camera controls a lens driving unit 8 to adjust the position of the focus lens included in the imaging lens 1 or to adjust the position of the zoom lens included in the imaging lens 1. Further, the system control unit 11 controls the degree of opening of the diaphragm 2 through a diaphragm driving unit 9 to adjust a light exposure value.

Further, the system control unit 11 drives the solid-state imaging element 5 through an imaging element driving unit 10, and outputs a subject image captured through the imaging lens 1 as a captured image signal. An instruction signal from a user is input to the system control unit 11 through an operation unit 14.

The system control unit 11 selects either one of a contrast AF processing unit 18 or a phase difference AF processing unit 19, and moves the focus lens to a focusing position determined by the selected processing unit, as described later.

Further, the electric control system of the digital camera includes a main memory 16, a memory control unit 15 connected to the main memory 16, a digital signal processing unit 17, the contrast AF processing unit 18, the phase difference AF processing unit 19, an external memory control unit 20 to which a detachable recording medium 21 is connected, and a display control unit 22 to which a display unit 23 mounted on a rear surface or the like of the camera is connected. The digital signal processing unit 17 generates captured image data by performing an interpolation operation, a gamma correction operation, a RGB/YC conversion process, and the like with respect to a captured image signal output from the A/D conversion circuit 7. The contrast AF processing unit 18 determines a focusing position according to a contrast AF method. The phase difference AF processing unit 19 determines a focusing position according to a phase difference AF method.

The memory control unit 15, the digital signal processing unit 17, the contrast AF processing unit 18, the phase difference AF processing unit 19, the external memory control unit 20, and the display control unit 22 are connected to each other through a control bus 24 and a data bus 25, and are controlled by instructions from the system control unit 11.

Figure 2:
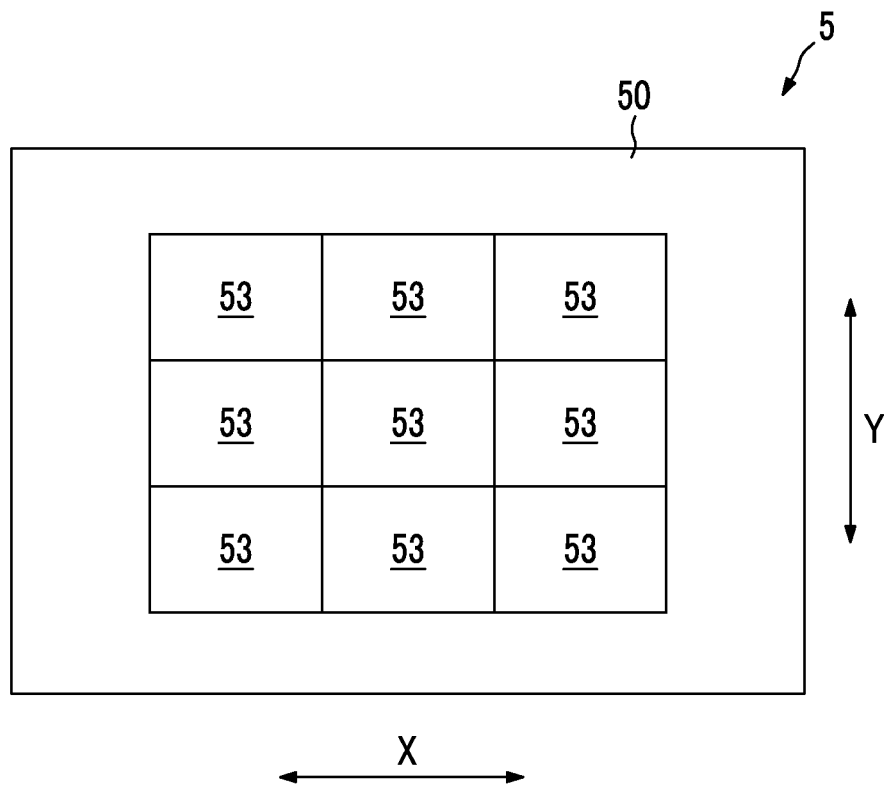
FIG. 2 is a schematic plan view illustrating an overall configuration of a solid-state imaging element 5 mounted on the digital camera shown in FIG. 1.

FIG. 2 is a schematic plan view illustrating an overall configuration of the solid-state imaging element 5 mounted on the digital camera shown in FIG. 1.

The solid-state imaging element 5 includes a light receiving surface 50 on which multiple pixels which are arranged in a two-dimensional pattern in a row direction X and in a column direction Y orthogonal to the row direction X. Nine AF areas 53 which are target areas for focusing are provided on the light receiving surface 50 in the example of FIG. 2.

The AF area 53 is an area that includes an imaging pixel and a phase difference detection pixel as pixels.

In a portion where the AF areas 53 are excluded on the light receiving surface 50, only imaging pixels are disposed. The AF areas 53 may be provided on the light receiving surface 50 without a gap.

Figure 3:
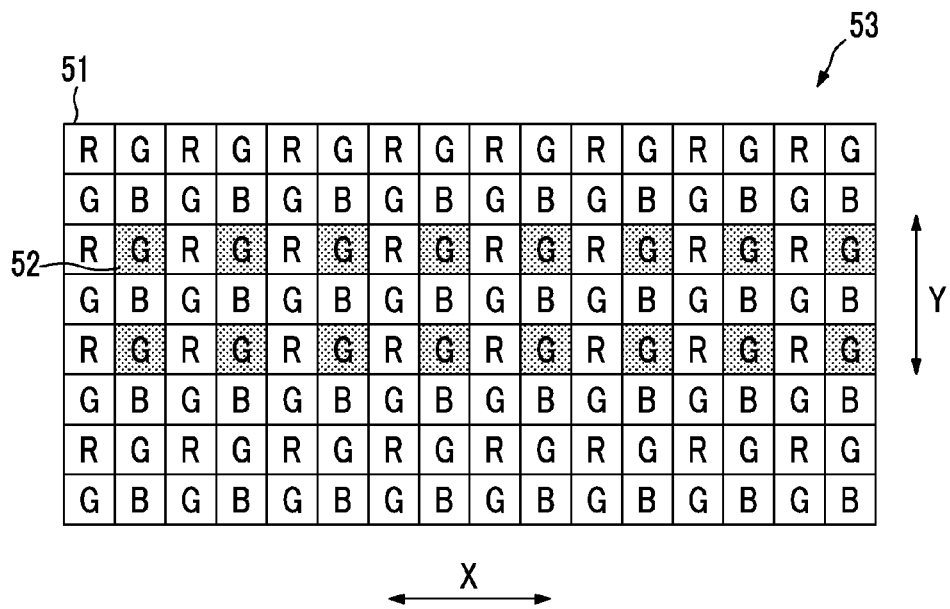
FIG. 3 is a partially enlarged view of a single AF area 53 shown in FIG. 2.

FIG. 3 is a partially enlarged view of a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The array of the color filters is a Bayer array over the entirety of the light receiving surface 50.

In the AF area 53, a part of the G pixels 51 (shaded pixels 51 in FIG. 3) are used as the phase difference detection pixels 52. In the example of FIG. 3, each G pixel 51 in an arbitrary pixel row among pixel rows including the R pixels 51 and the G pixels 51, and the G pixel 51 closest to each G pixel 51 in the column direction Y are used as the phase difference detection pixels 52. Here, as shown in FIG. 3, one direction in the two-dimensional array is defined as the X direction or the row direction, and the other direction is defined as the Y direction or the column direction.

Figure 4:
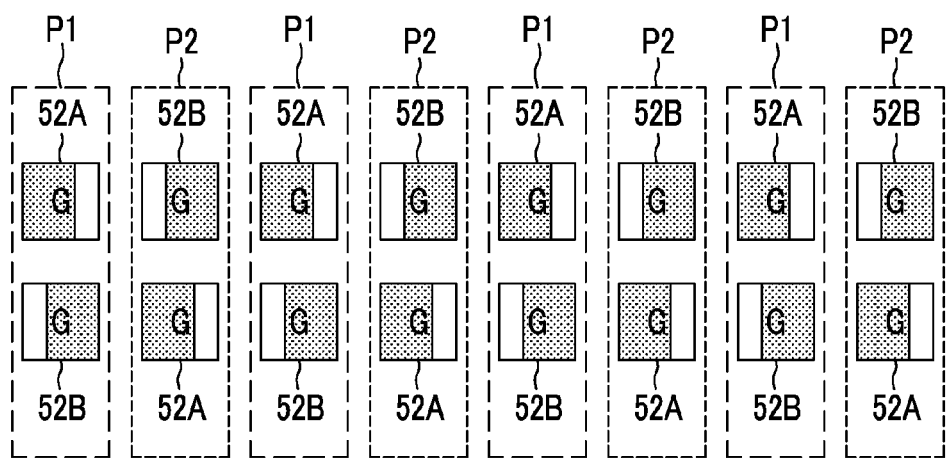
FIG. 4 is a diagram illustrating only a phase difference detection pixel 52 shown in FIG. 3.

FIG. 4 is a diagram illustrating only the phase difference detection pixels 52 shown in FIG. 3.

As shown in FIG. 4, the phase difference detection pixels 52 include two types of phase difference detection pixels 52A and phase difference detection pixels 52B.

The phase difference detection pixel 52A is a first signal detection unit that receives one beam among a pair of beams that passes through different portions in a pupil region of the imaging lens 1, and detects a signal depending on the intensity of received light.

The phase difference detection pixel 52B is a second signal detection unit that receives the other beam among the pair of beams, and detects a signal depending on the intensity of received light.

In the AF area 53, plural pixels 51 other than the phase difference detection pixels 52A and 52B are imaging pixels, and each imaging pixel receives the pair of beams that passes through the imaging lens 1, and detects a signal depending on the intensity of received light.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A. Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

With such a configuration, it is possible to detect a phase difference in the row direction X in images respectively captured by two pixel groups, that is, a pixel group that includes the phase difference detection pixels 52A which are positioned in an arbitrary row, and a pixel group that includes the phase difference detection pixels 52B which are disposed at the same distance in the same direction with respect to each of the phase difference detection pixels 52A of the former pixel group.

As shown in FIG. 4, in the AF area 53, at least one pair line in which a pixel pair P1 that includes the phase difference detection pixel 52A and the phase difference detection pixel 52B disposed at a predetermined distance in a direction orthogonal to the phase difference detection direction (row direction X) with respect to the phase difference detection pixel 52A and a pixel pair P2 having a reverse positional relationship with respect to the positional relationship of the phase difference detection pixel 52A and the phase difference detection pixel 52B in the pixel pair PI are alternately disposed in the X direction is provided.

It can be said that the pair line includes a first pair of a first signal detection unit group (phase difference detection pixels 52A of the entire pixel pairs P1) including plural phase difference detection pixels 52A arranged along the phase difference detection direction and a signal detection unit group (phase difference detection pixels 52B of the entire pixel pairs P1) including the phase difference detection pixels 52B arranged at the same distance (distance corresponding to one pixel) in one direction along the Y direction (downward direction in the example shown in FIG. 4) with respect to the respective phase difference detection pixels 52A of the first signal detection unit group; and a second pair of a second signal detection unit group (phase difference detection pixels 52A of the entire pixel pairs P2) including plural phase difference detection pixels 52A arranged at the same distance in the same direction (on a diagonally lower right side in the example in FIG. 4) with respect to the respective phase difference detection pixels 52A of the first signal detection unit group and arranged along the detection direction and a signal detection unit group (phase difference detection pixels 52B of the entire pixel pairs P2) including the phase difference detection pixels 52B arranged at the same distance (distance corresponding to one pixel) in a direction (upward direction in the example shown in FIG. 4) different from the one direction of the Y direction with respect to the respective phase difference detection pixels 52A of the second signal detection unit group.

The phase difference AF processing unit 19 shown in FIG. 1 calculates a phase difference which is a relative position deviation amount of two images formed by the pair of beams using a detection signal group read from the phase difference detection pixels 52A and the phase difference detection pixels 52B disposed in one AF area 53 selected by a user operation or the like from among nine AF areas 53.

Further, the phase difference AF processing unit 19 calculates a focus adjustment state of the imaging lens 1 based on the phase difference. Here, the phase difference AF processing unit 19 calculates a deviation amount from a focused state and a deviation direction from the focused state, that is, a defocus amount. The phase difference AF processing unit 19 determines a focusing position of the focus lens from the defocus amount.

The system control unit 11 functions as a focusing control unit that performs a first focusing control (focusing control based on the phase difference AF method) for moving the focus lens to the focusing position determined by the phase difference AF processing unit 19 based on a result of a correlation operation of a detection signal of the phase difference detection pixel 52A and a detection signal of the phase difference detection pixel 52B.

The contrast AF processing unit 18 shown in FIG. 1 analyzes an image captured by one AF area 53 selected by the user operation or the like from among nine AF areas 53, and determines a focusing position of the imaging lens 1 according to a known contrast AF method.

That is, the contrast AF processing unit 18 calculates, while moving the position of the focus lens of the imaging lens 1 under the control of the system control unit 11, contrast (brightness difference) of images obtained at respective movement positions (plural positions). Further, the contrast AF processing unit 18 determines the position of the focus lens where the contrast becomes maximum as the focusing position. The contrast is obtained by using a sum of differences of signals of adjacent pixels.

The system control unit 11 functions as a focusing control unit that performs a second focus control (focusing control based on the contrast AF method) for moving the focus lens, in a maximum range (range from INF to MOD) where the focus lens is movable, along an optical axis direction from an end of the range by an arbitrary distance, and moving the focus lens to the focusing position determined by the contrast AF processing unit 18 based on the contrast of the captured images captured by the solid-state imaging element 5 at the respective movement positions.

Instead of one AF area 53, plural AF areas 53 which are continuously arranged may be selected.

Hereinafter, an operation of the digital camera in a consecutive photographing mode where an imaging process of performing image capturing (still image capturing) by the solid-state imaging element 5 in a state of being focused on a subject is consecutively performed plural times (hereinafter, it is assumed that the imaging process is performed K times) by either one of the focusing control based on the contrast AF method or the focusing control based on the phase difference AF method will be described. The imaging includes processes from exposure start of the solid-state imaging element 5 to reading of a captured image signal obtained through the exposure from the solid-state imaging element 5.

Figure 5:
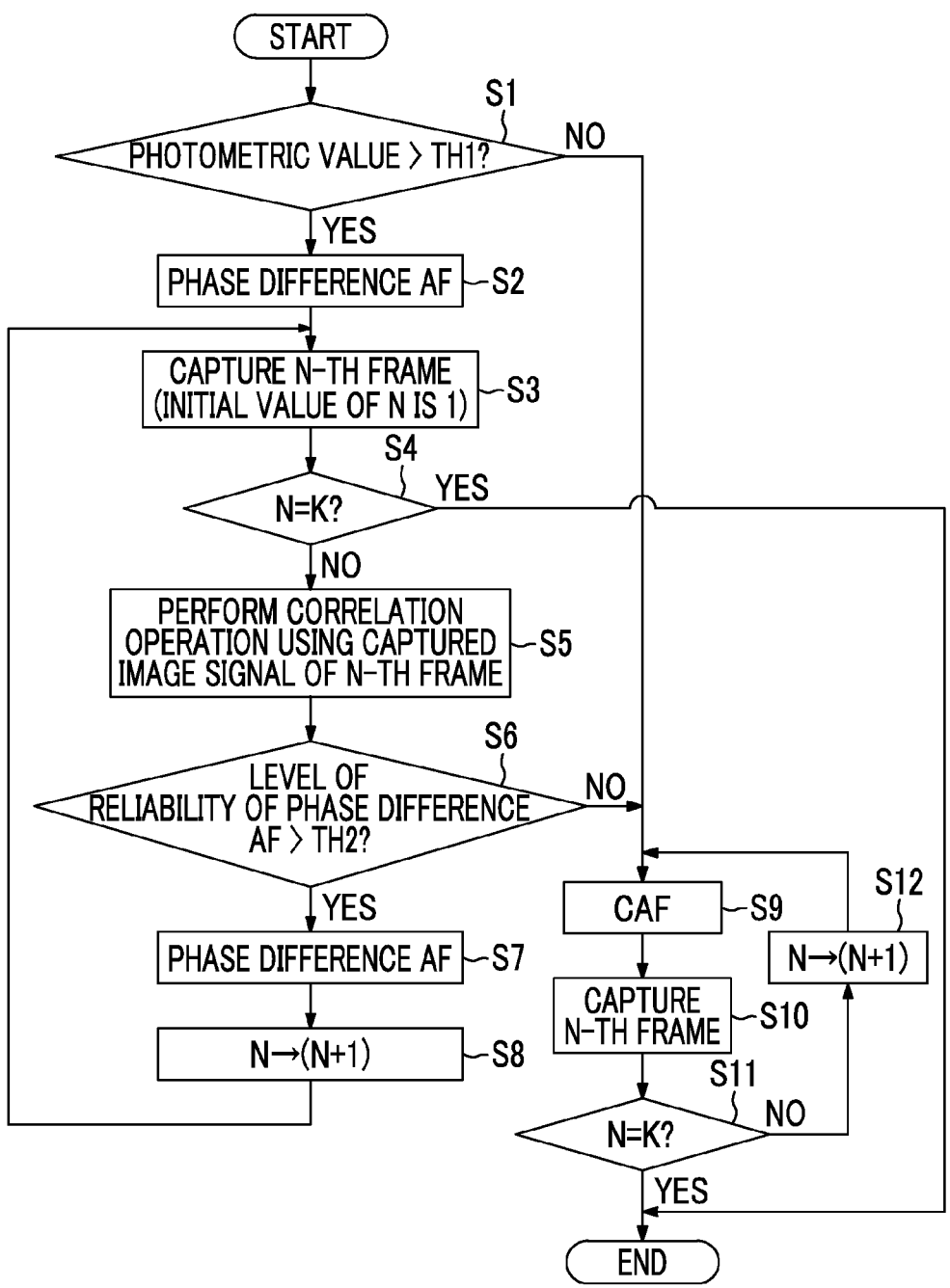
FIG. 5 is a flowchart illustrating an operation in a consecutive photographing mode of the digital camera shown in FIG. 1.

FIG. 5 is a flowchart illustrating an operation in the consecutive photographing mode of the digital camera shown in FIG. 1.

If the consecutive photographing mode is set and a consecutive photographing start instruction is given, the system control unit 11 calculates a photometric value (EV value) using a captured image signal obtained by imaging performed for live view image display.

Then, if the photometric value is greater than a threshold value TH1 (step S1: YES), the system control unit 11 performs a process of step S2, and if the photometric value is equal to or smaller than the threshold value TH (step S1: NO), the system control unit 11 performs a process of step S9.

In step S9, the system control unit 11 performs the focusing control based on the contrast AF (in the figure, referred to as CAF). That is, the system control unit 11 causes the contrast AF processing unit 18 to determine a focusing position, and moves the focus lens to the determined focusing position.

Subsequent to step S9, the system control unit 11 causes the solid-state imaging element 5 to image-capture an N-th frame (an initial value is 1) in consecutive photographing (step S10). Captured image data is generated from a captured image signal acquired by the imaging by the digital signal processing unit 17, and the captured image data is recorded on the recording medium 21.

Subsequent to step S10, the system control unit 11 sets N to (N+1) in step S11 when N is not K, and then, performs the process of step S9. The system control unit 11 repeats the imaging processes of step S9 and step S10 until N becomes K. Further, the system control unit 11 terminates the consecutive photographing when N is K.

In step S2, the system control unit 11 performs the focusing control based on the phase difference AF method. That is, the system control unit 11 causes the phase difference AF processing unit 19 to determine a focusing position, and moves the focus lens to the determined focusing position.

Specifically, the phase difference AF processing unit 19 acquires detection signals of the phase difference detection pixels 52A and the phase difference detection pixels 52B disposed in a selected AF area 52, and performs a correlation operation of detection signal groups of the phase difference detection pixels 52A and the phase difference detection pixels 52B of the pixel pairs P1 that form one pair line among the acquired detection signals.

When data on one detection signal group is represented as A[1], ..., and A[k] and data on the other detection signal group is represented as B[1], ..., and B[k], the phase difference AF processing unit 19 calculates an area C[d] surrounded by two data waveforms calculated by the following expression when two sets of data are shifted by a shift amount "d".

$$C[d] = \sum_{n=1}^{k} (A[n+d] - B[n])^2 \qquad (1)$$

$$d = -L, \ldots, -2, -1, 0, 1, 2, \ldots, L$$

Hereinafter, a correlated value which is the result of the correlation operation in step S2 is represented as C1[d]. The correlated value C1[d] is a value indicating a matching rate of images captured by each phase difference detection pixel 52A and each phase difference detection pixel 52B of the pixel pair P1.

The phase difference AF processing unit 19 calculates a value "d" when the value of the correlated value C1[d] becomes minimum as a phase difference amount, calculates a defocus amount from the phase difference amount, and determine the focusing position of the focus lens. The system control unit 11 moves the focus lens to the determined focusing position.

After terminating the focusing control in step S2, the system control unit 11 causes the solid-state imaging element 5 to perform imaging of the N-th (initial value is 1) frame in consecutive photographing (step S3).

Subsequent to step S3, the system control unit 11 terminates the consecutive photographing when N is K, and performs a process of step S5 when N is not K.

in step S5, the system control unit 11 executes the correlation operation with respect to the phase difference AF processing unit 19. The phase difference AF processing unit 19 acquires detection signal groups of the phase difference detection pixels 52A and the phase difference detection pixels 52B of the pixel pairs P1 that form one pair line included in a captured image signal obtained by imaging in step S3, and performs a correlation operation of the detection signal groups.

The system control unit 11 determines a reliability of the focusing control based on the phase difference AF using the result of the correlation operation obtained in step S5 (step S6).

In a case where there are plural minimum points and there is no minimum point in a graph in which a transverse axis represents the correlated value C[d] obtained in step S5 and a longitudinal axis represents d, the system control unit 11 determines that the reliability is equal to or lower than a threshold value TH2 (first threshold value). On the other hand, in a case where only one minimum point is present in the graph and in a case where the correlated value C[d] in the minimum point is smaller than a predetermined value, the system control unit 11 determines that the reliability is higher than the threshold value TH2.

When the correlated value C[d] is small, this means that a matching rate of two images when an image obtained by the phase difference detection pixel 52A and an image obtained by the phase difference detection pixel 52B are shifted by the shift amount d is high. In a case where the correlated value C[d] is large, for example, since the matching rate between the image obtained by the phase difference detection pixel 52A and the image obtained by the phase difference detection pixel 52B is low, and thus, there is a possibility that the images are images of a different subject.

As the result of determination in step S6, in a case where the reliability is equal to or lower than the threshold value TH2 (step S6: NO), the system control unit 11 performs the process of step S9.

As the result of determination in step S6, in a case where the reliability is higher than the threshold value TH2 (step S6: YES), the system control unit 11 performs a process of step S7.

in step S7, the system control unit 11 performs the focusing control based on the phase difference AF method. Then, the system control unit 11 sets N to (N+1) in step S8, and then, performs the process of step S3. In step S7, the phase difference AF processing unit 19 determines the defocus amount based on the result of the correlation operation of step S5.

As described above, according to the digital camera in FIG. 1, after the focusing control based on the phase difference AF method is performed in the imaging process of the first frame in the consecutive photographing mode, in a case where the reliability of the focusing control based on the phase difference AF calculated from the result of the correlation operation of the detection signal groups of the phase difference detection pixels 52A and the phase difference detection pixels 52B of the pixel pairs P1 read from the solid-state imaging element 5 at an arbitrary timing (step S3 in FIG. 5) becomes low after the focusing control is performed, the focusing control based on the contrast AF method is performed in each time of imaging to performed next time.

Thus, it is possible to prevent the focusing control based on the phase difference AF method with a low level of reliability, and to prevent the occurrence of a focusing error or deterioration in focusing accuracy during consecutive photographing.

In step S1 of FIG. 5, it is determined whether to transition to the focusing control based on the phase difference AF method or the focusing control based on the contrast AF method according to the size of the photometric value. However, the reliability of the focusing control based on the phase difference AF method is calculated in a similar way to step S6. That is, if the reliability is higher than the threshold value TH2, the process of step S2 may be performed, and if the reliability is equal to or lower than the threshold value TH2, the process of step S9 may be performed.

Further, in step S5 of FIG. 5, the phase difference AF processing unit 19 acquires detection signal groups of the phase difference detection pixels 52A and the phase difference detection pixels 52B of the "pixel pairs P2" that form one pair line instead of the pixel pair P1, and may perform a correlation operation of the detection signal groups.

A configuration in which the solid-state imaging element 5 includes the pair line where the pixel pair P1 and the pixel pair P2 are alternately arranged in the row direction X is shown, but since it is sufficient if the correlation operation for determination of the reliability can be performed, a configuration in which the pixel pair P1 is not provided or the pixel pair P2 is not provided may be used.

Further, in the example of FIG. 5, a configuration in which if the reliability is equal to or lower than the threshold value TH2 in step S6 even once, the procedure transitions to step S9 is shown, but a configuration in which in a case where the reliability after imaging of the N-th frame and the reliability after imaging of the (N+1)-th frame are equal to or lower than the threshold value TH2, the procedure transitions to step S9 may be used.

That is, only in a case where the reliability is equal to or lower than the threshold value TH2 consecutively over plural times, the procedure may transition to step S9. In this case, after the reliability is equal to or lower than the threshold value TH2 for the first time, the focusing control based on the phase difference AF is performed in step S7. Here, by using the focusing position as the focusing position used in the imaging process of the previous frame, it is possible to prevent the occurrence of a focusing error.

With such a configuration, it is possible to prevent the digital camera from transitioning to the focusing control based on the contrast AF method as the reliability sporadically drops due to some reasons. Compared with the focusing control based on the phase difference AF method, the focusing control based on the contrast AF method has a large amount of computation, and needs lens driving which consumes a large amount of power. Thus, by reducing a probability of transitioning to the focusing control based on the contrast AF method, it is possible to reduce power consumption.

When an F-number of the diaphragm 2 is large, since the diaphragm 2 is narrowed down and an incidence angle of light incident onto the solid-state imaging element 5 is small, a phase difference between signals detected in the pixel pairs P1 and P2 does not easily occur.

On the other hand, when the F-number is small, since the incidence angle of light incident onto the solid-state imaging element 5 is large, the phase difference between the signals in the pixel pairs P1 and P2 easily occurs. Here, the F-number is represented as F=f/D when an opening diameter of the diaphragm is D and a focal distance of the lens is f.

Thus, it is preferable to perform consecutive photographing according to the flowchart of FIG. 5 in a case where the F-number set in imaging of each frame in the consecutive photographing mode is equal to or smaller than a threshold value TH3 (second threshold value), and to perform consecutive photographing according to a flowchart of FIG. 6 to be described hereinafter in a case where the F-number is greater than the threshold value TH3.

Figure 6:
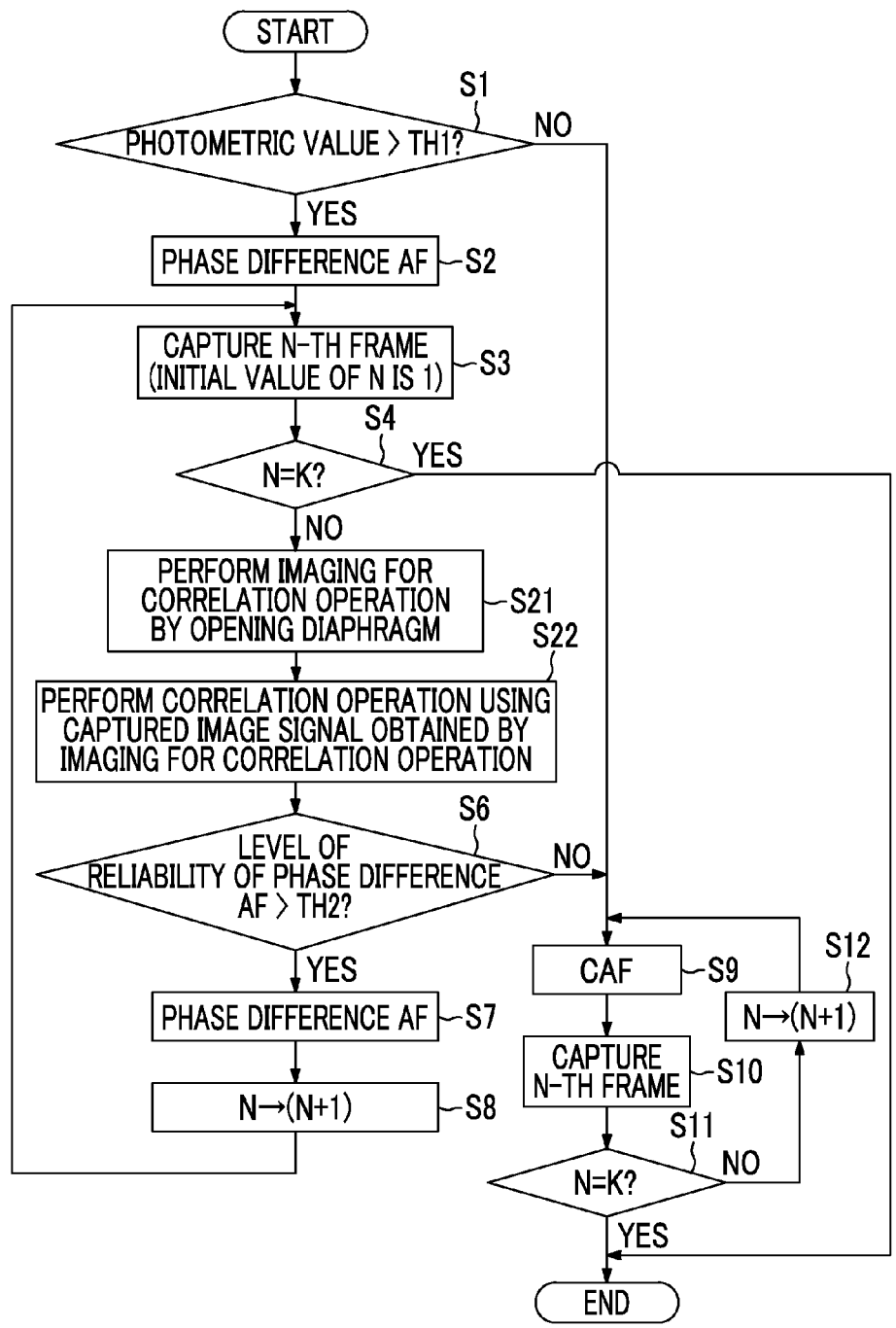
FIG. 6 is a flowchart illustrating a modification example of an operation in the consecutive photographing mode of the digital camera shown in FIG. 1.

FIG. 6 is a flowchart illustrating a modification example of an operation in the consecutive photographing mode of the digital camera shown in FIG. 1. FIG. 6 shows an operation when the F-number set in imaging of each frame in consecutive photographing is larger than the threshold value TH3. In FIG. 6, the same reference numerals are given to the same processes as the processes shown in FIG. 5.

In a case where N is not K in step S4, the system control unit 11 causes the solid-state imaging element 5 to perform imaging in a state where the F-number of the diaphragm 2 is controlled to be equal to or smaller than the threshold value TH3 (ideally, in a state where the diaphragm 2 is opened to the maximum) (step S21). This imaging is virtual imaging for acquiring signals which are correlation operation targets in a subsequent step S22.

In a case where the F-number when each of N imaging processes is performed is greater than the threshold value TH3, the system control unit 11 functions as an imaging control unit that causes the solid-state imaging element to perform virtual imaging between an imaging process of an arbitrary time and an imaging process next to the imaging process of the arbitrary time among the N imaging processes.

If the virtual imaging in step S21 is terminated, the phase difference AF processing unit 19 acquires detection signal groups of the phase difference detection pixels 52A and the phase difference detection pixels 52B of the pixel pairs P1 (or P2) that form one pair line included in a captured image signal obtained by the virtual imaging, and performs a correlation operation of the detection signal groups (step S22).

Subsequent to step S22, in step S6, the system control unit 11 determines the reliability of the focusing control based on the phase difference AF method from the result of the correlation operation performed in step S22. Further, if the reliability is high, the system control unit 11 performs the focusing control based on the phase difference AF method based on the result of the correlation operation of step S22, and if the reliability is low, the system control unit 11 performs the focusing control based on the contrast AF method.

As described above, in a case where the F-number is greater than the threshold value TH3 in imaging set in each frame in consecutive photographing, by performing virtual imaging (in which the F-number is equal to or smaller than the threshold value TH3) for acquiring signals which are correlation operation targets between imaging processes of the respective frames, it is possible to enhance determination accuracy of the reliability.

Hereinbefore, a configuration in which in a case where the reliability of the focusing control based on the phase difference AF method is equal to or lower than the threshold value TH2, the focusing control based on the contrast AF method is performed in all imaging processes of the remaining frames other than the imaging-completed frames is described. However, in view of reduction in power consumption, it is preferable to perform the focusing control based on the phase difference AF method if possible.

Accordingly, even after the reliability of the focusing control based on the phase difference AF method is equal to or lower than the threshold value TH2, in a case where the reliability of the focusing control based on the phase difference AF method is higher than the threshold value TH2 again due to a change of an imaging situation, or the like, it is effective to return the focusing control based on the contrast AF method to the focusing control based on the phase difference AF method.

However, there are various factors of the reliability of the focusing control based on the phase difference AF method becoming low, such as a case where the main subject is a high frequency subject, a case where ghost or flare occurs, or a case where the brightness of the main subject is excessively low.

Among these factors, in a case where the ghost or flare occurs or the brightness of the main subject is excessively low, there is a high possibility that the situation becomes better as frames in consecutive photographing are changed. However, in a case where the main subject is the high frequency subject, even though the frames in consecutive photographing are changed, a possibility that the situation is changed is low.

In a case where the main subject is the high frequency subject, a subject image is blurred as the focusing position is greatly changed, so that the reliability of the focusing control based on the phase difference AF method may become high. If the focusing control based on the phase difference AF method is performed as the reliability becomes high, the blurring of the subject image decreases. As a result, the reliability of the focusing control based on the phase difference AF method becomes low again as the image of the high frequency subject is sharply formed, and then, the digital camera transitions to the focusing control based on the contrast AF method. There is a possibility that the above-described operations are repeated.

Accordingly, the system control unit 11 determines the factor of the digital camera transitioning to the focusing control based on the contrast AF method from the focusing control based on the phase difference AF method, and stores the factor. Further, in a case where the factor is due to the high frequency subject, even in a case where the reliability of the focusing control based on the phase difference AF method is higher than the threshold value TH2, the digital camera continuously performs the focusing control based on the contrast AF method without returning to the focusing control based on the phase difference AF method.

With this configuration, it is possible to prevent the focusing control based on the contrast AF method and the focusing control based on the contrast AF method from being frequently switched during consecutive photographing, and to perform stable imaging. Hereinafter, the operation will be described in detail.

Figure 7:
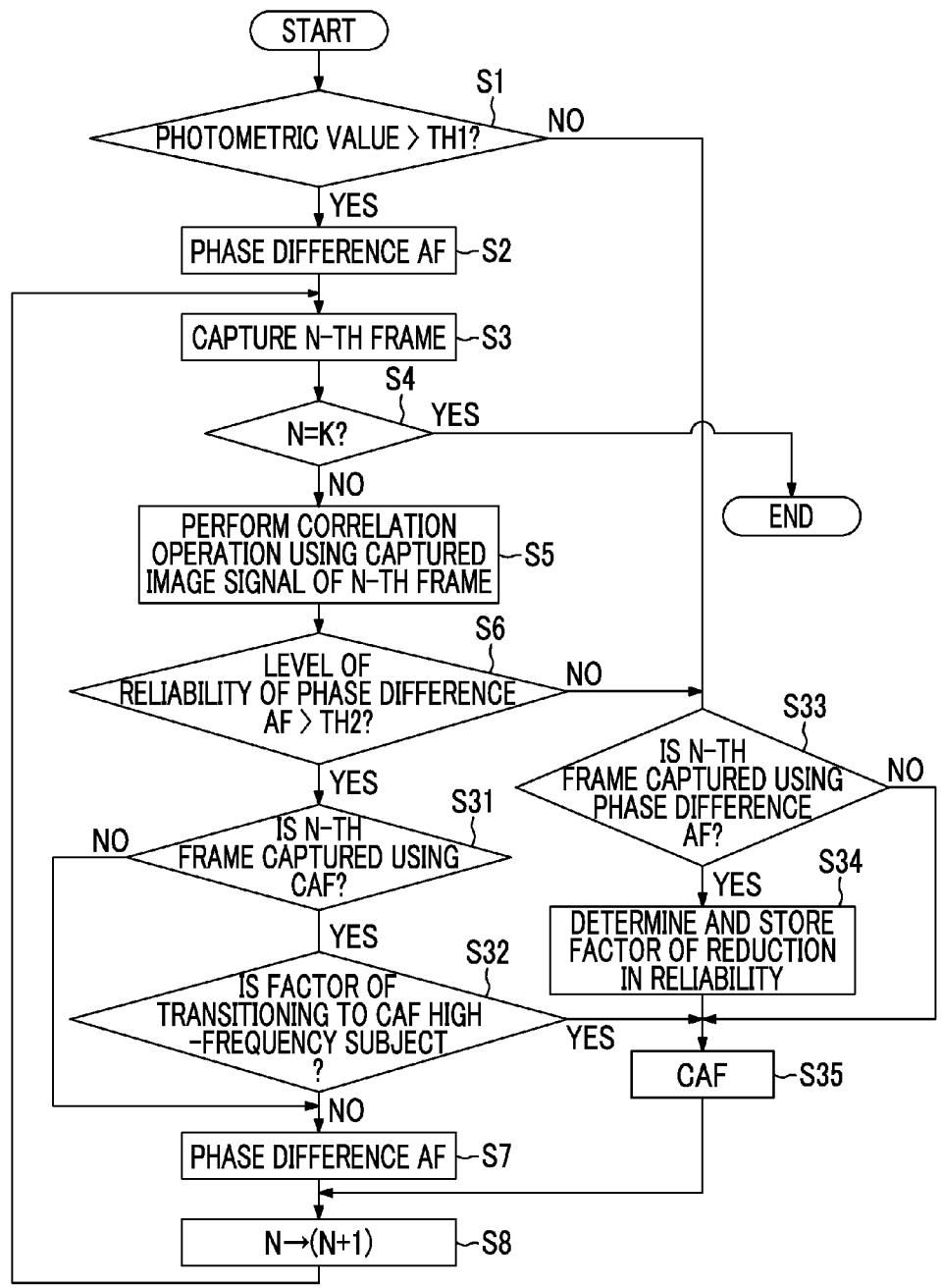
FIG. 7 is a flowchart illustrating a modification example of the operation in the consecutive photographing mode of the digital camera shown in FIG. 1.

FIG. 7 is a flowchart illustrating a modification example of the operation in the consecutive photographing mode of the digital camera shown in FIG. 1. In FIG. 7, the same reference numerals are given to the same processes shown in FIG. 5, and description thereof will not be repeated.

In a case where the determination in step S6 is negative, if the imaging in step S3 is imaging performed after the focusing control based on the phase difference AF method (step S33: YES), in step S34, the system control unit 11 determines a factor of the negative determination in step S6, that is, a factor of the reliability of the focusing control based on the phase difference AF method becoming equal to or lower than the threshold value TH2.

If the imaging in step S3 is the imaging performed after the focusing control based on the contrast AF method (step S33: NO), the system control unit 11 performs the focusing control based on the contrast AF method in step S35, and then, the procedure transitions to the process of step S8.

A determination method of the factor in step S34 will be described.

In a case where the frequency of a subject image formed in an AF area is high, there is a high possibility that plural minimum values appear in a curve of the correlated value C[d] obtained in the correlation operation of step S5.

In a case where the frequency of the subject image formed in the AF area is low and the reliability becomes low due to ghost, flare, brightness, or the like, there is a high possibility that a minimum value does not exist in the curve of the correlated value C[d] obtained in the correlation operation of step S5.

Thus, it is possible to determine the factor according to whether there are plural minimum values or the minimum value is 0.

Specifically, if there are plural minimum values, the system control unit 11 determines that the factor is based on the frequency of the subject image. Further, if the minimum value does not exist, the system control unit 11 determines that the factor is not based on the frequency of the subject image.

Instead of the method of determining the factor depending on the number of minimum values in this way, a method of accurately determining the factor will be described hereinafter.

First, the phase difference AF processing unit 19 acquires detection signals of the phase difference detection pixels 52A and the phase difference detection pixels 52B disposed in a selected AF area 52 from the captured image signal obtained in step S3, and performs a correlation operation of detection signal groups of the phase difference detection pixels 52A and the phase difference detection pixels 52B of the pixel pairs P2 that form one pair line among the acquired detection signals.

Thus, a correlated value C1[d] corresponding to the pixel pair P1 and a correlated value C2[d] corresponding to the pixel pair P2 with respect to the same AF area are obtained in parallel with the process of step S5.

Then, the phase difference AF processing unit 19 generates a reliability determination value J1 for determining the reliability of the focusing control based on the phase difference AF method using the correlated value C1[d] and the correlated value C2[d]. The phase difference AF processing unit 19 functions as an information generation unit that generates the reliability determination value J1.

In a case where the frequency of the subject image formed in the pair line is low, a shape of a graph in which a transverse axis represents the shift amount d and a longitudinal axis represents C[d] is approximately uniform between C1[d] and C2[d]. However, in a case where the frequency of the subject image formed in the pair line is high, the shape of the graph greatly varies between C1[d] and C2[d]. That is, by checking the matching rate between the shape of the graph based on C1[d] and the shape of the graph based on C2[d], it is possible to determine whether or not the frequency of the subject image is high.

Specifically, the reliability determination value J1 is generated by performing an operation of Expression (2).

$$J1 = \frac{\sum_{d=-L}^{L} |C1[d] - C2[d]|}{\sum_{d=-L}^{L} C1[d] + \sum_{d=-L}^{L} C2[d]} \quad (2)$$

A numerator in Expression (2) becomes a small value in a case where the shape of the graph based on C1[d] and the shape of the graph based on C2[d] are similar to each other, and becomes a large value in a case where the two shapes are different from each other.

In a case where the frequency of the subject image formed in the AF area 53 is high, since the graph shapes of C1[d] and C2[d] are greatly changed, the reliability determination value J1 becomes a large value.

On the other hand, even in a case where the frequency of the subject image formed in the AF area 53 is not high, in a case where ghost or flare locally occurs, or in a case where the brightness of the subject is low, for example, the reliability determination value J1 becomes a large value, but becomes a small value compared with a case where the frequency of the subject is high.

Thus, it is possible to determine a factor of the reliability of the focusing control based on the phase difference AF method becoming low according to the size of the reliability determination value J1.

Specifically, if J1 is equal to or greater than a threshold value TH4, the system control unit 11 determines that the accuracy of the phase difference AF cannot be obtained since the frequency of the subject image formed in the AF area 53 is high.

Further, if J1 is smaller than the threshold value TH4, the system control unit 11 determines that the frequency of the subject image formed in the AF area 53 is not high but the accuracy of the phase difference AF cannot be obtained due to other factors (ghost, flare, or low brightness).

As described above, it is possible to determine the factor of the reliability of the focusing control based on the phase difference AF method becoming low with high accuracy.

After the factor is determined in step S34, the system control unit 11 stores the determined factor in an internal memory in association with a number of a finally captured frame, and then, performs a process of step S35.

After the process of step S34 is performed once, the focusing control based on the contrast AF method is performed in each image capturing process performed until the determination of step S6 becomes affirmative.

When the determination in step S6 is affirmative, if the focusing control in the imaging process of the N-th frame is the focusing control based on the contrast AF method (step S31: YES), the system control unit 11 performs a process of step S32.

Further, if the focusing control in the imaging process of the N-th frame is the focusing control based on the phase difference AF method (step S31: NO), the system control unit 11 performs the process of step S7.

In step S32, the system control unit 11 determines whether or not the factor stored in the internal memory is based on a high frequency subject. If the factor is based on the high frequency subject (step S32: YES), the system control unit 11 performs a process of step S35.

On the other hand, if the factor is not based on the high frequency subject (step S32: NO), the system control unit 11 performs the process of step S7 after deleting the factor from the internal memory.

In this way, even in a case where the reliability is higher than the threshold value TH2 after the reliability of the focusing control based on the phase difference AF method becomes equal to or smaller than the threshold value TH2, if the factor when the reliability becomes low is based on the high frequency subject, the focusing control based on the contrast AF method is continuously performed, and thus, it is possible to prevent the focusing control based on the phase difference AF method and the focusing control based on the contrast AF method from being frequently switched.

On the other hand, if the factor when the reliability becomes low is not based on the high frequency subject, since the digital camera can return to the focusing control based on the phase difference AF method, it is possible to reduce power consumption.

Hereinbefore, the operation has been described only in the consecutive photographing mode, but the invention is effective in a mode where plural times of imaging processes are consecutively performed, and for example, may be applied to a moving image capturing mode.

In step S6 of FIGS. 5 to 7, the above-described reliability determination value J1 is calculated, and the reliability may be determined according to the size of the reliability determination value J1. In FIGS. 5 to 7, in step S6, since the reliability is determined according to the presence or absence of a minimum value or the number of minimum values, it is possible to determine the reliability with a small amount of computation.

Further, in step S34 in FIG. 7, if the method of determining the factor according to the number of minimum values is also employed, it is possible to reduce the amount of computation to reduce power consumption.

Figure 8:
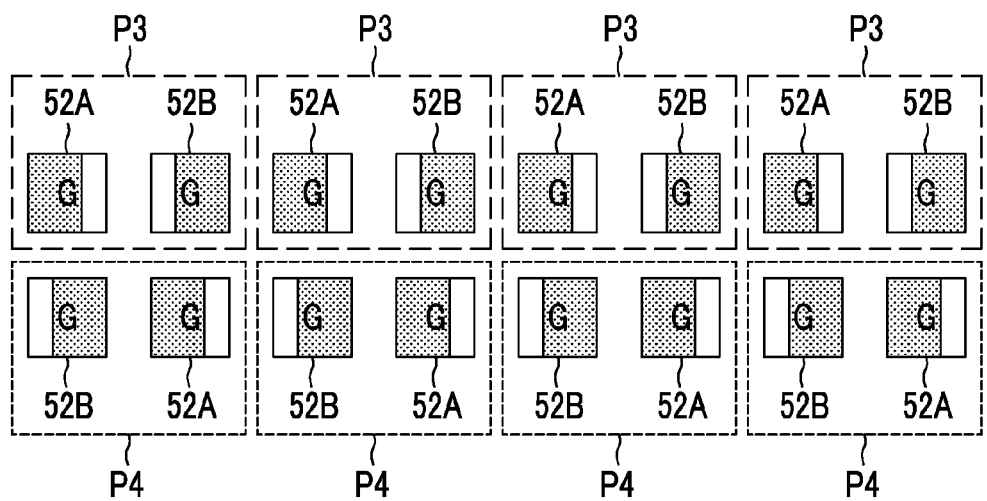
FIG. 8 is a diagram illustrating a modification example of a pixel pair set in a pair line.

Hereinbefore, the pair line disposed in the AF area 53 is described as a line including the pixel pairs P1 and the pixel pairs P2, but as shown in FIG. 8, the pair line may be a line including the pixel pairs P3 and the pixel pairs P4.

That is, the pair line may be configured to include a line in which the pixel pairs P3 including the phase difference detection pixel 52A and the phase difference detection pixel 52B disposed at a predetermined distance with respect to the phase difference detection pixel 52A in the phase difference detection direction (row direction X) are arranged in the row direction X and a line in which the pixel pairs P4 having a reverse positional relationship with respect to the positional relationship of the phase difference detection pixel 52A and the phase difference detection pixel 52B in the pixel pair P3 are arranged disposed in the X direction.

In a case where the pixel pairs P3 and P4 are set in the pair line as shown in FIG. 8, the phase difference AF processing unit 19 performs a correlation operation between detection signal groups of the phase difference detection pixels 52A and 52B of the pixel pair P3, and performs a correlation operation between detection signal groups of the phase difference detection pixels 52A and 52B of the pixel pair P4. Further, the reliability determination value J1 is generated based on two correlation operation results.

Hereinbefore, an example in which two adjacent pixel lines that respectively include the phase detection pixels 52A and 52B disposed in the AF area 53 are used as one block and the reliability determination value J1 is generated using detection signals of the respective phase difference detection pixels 52A and 52B disposed in the block is shown.

As a modification example of the block, three or more pixel lines including phase detection pixels disposed in the AF area 53 may be used as one block, and the reliability determination value J1 may be generated using detection signals of the respective phase difference detection pixels 52A and 52B disposed in the block. Hereinafter, a modification example of the array of the phase difference detection pixels in the block will be described (First Modification Example of Array)

Figure 9:
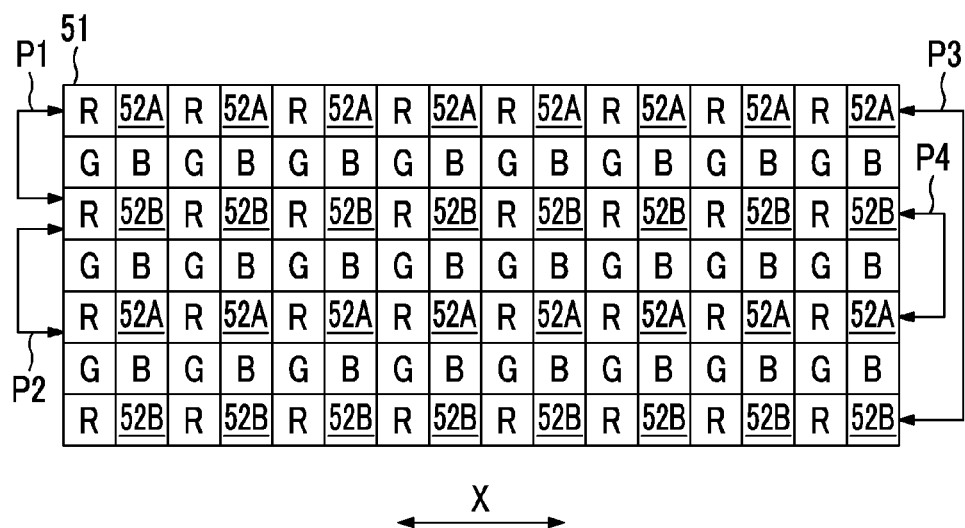
FIG. 9 is a diagram illustrating a modification example of an array of phase difference detection pixels 52A and 52B which are positioned at the AF area 53 of the solid-state imaging element 5 shown in FIG. 1.

FIG. 9 is a diagram illustrating a modification example of the array of the phase difference detection pixels 52A and 52B which are positioned in the AF area 53 of the solid-state imaging element 5 shown in FIG. 1.

In the array example shown in FIG. 9, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as one block. In the following description of FIG. 9, for ease of description, it is assumed that the upward direction and the downward direction represent a vertical direction in the figure.

In one block shown in FIG. 9, respective phase difference detection pixels included in phase difference pixel lines in odd-numbered rows are the phase difference detection pixels 52A, and respective phase difference detection pixels included in phase difference pixel lines in even-numbered rows are the phase difference detection pixels 52B.

In the array example shown in FIG. 9, each phase difference detection pixel 52A in the phase difference pixel line in the first row in the block and each phase difference detection pixel 52B disposed at a one-pixel interval with respect to each phase difference detection pixel 52A in the downward direction form a pixel pair P1.

Further, each phase difference detection pixel 52A in the phase difference pixel line in the third-row in the block and each phase difference detection pixel 52B disposed at a one-pixel interval with respect to each phase difference detection pixel 52A in the upward direction form a pixel pair P2.

Further, each phase difference detection pixel 52A in the first-row phase difference pixel line in the block and each phase difference detection pixel 52B disposed at a five-pixel interval with respect to each phase difference detection pixel 52A in the downward direction form a pixel pair P3.

In addition, each phase difference detection pixel 52A in the third-row phase difference pixel line in the block and each phase difference detection pixel 52B disposed at a one-pixel interval with respect to each phase difference detection pixel 52A in the upward direction form a pixel pair P4.

According to the array example of FIG. 9, since the array is an array of phase difference detection pixels which is generally used, the array may be easily applied to a known solid-state imaging element, which enhances versatility.

(Second Modification Example of Array)

Figure 10:
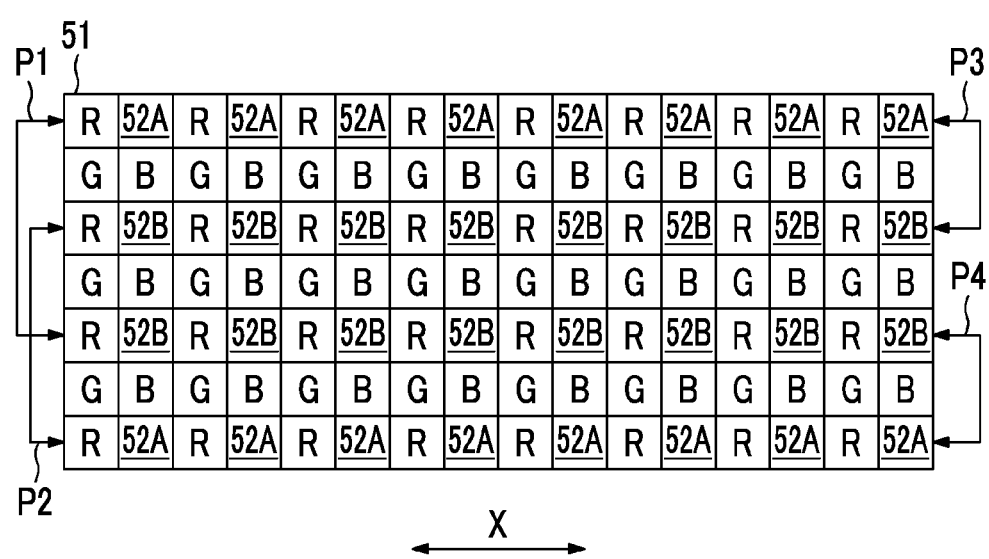
FIG. 10 is a diagram illustrating a modification example of the array of the phase difference detection pixels 52A and 52B which are positioned at the AF area 53 of the solid-state imaging element 5 shown in FIG. 1.

FIG. 10 is a diagram illustrating a modification example of the array of the phase difference detection pixels 52A and 52B which are positioned in the AF area 53 of the solid-state imaging element 5 shown in FIG. 1.

In the array example shown in FIG. 10, two phase difference pixel lines that include plural phase difference detection pixels 52A arranged in the row direction X, and two phase difference pixel lines that include plural phase difference detection pixels 52B arranged in the row direction X are provided in the AF area 53, and reliability determination is performed using the four phase difference pixel lines as one block.

In one block shown in FIG. 10, each phase difference pixel included in phase difference pixel lines in the first row and the fourth row is the phase difference detection pixel 52A, and each phase difference pixel included in phase difference pixel lines in the second row and the third row is the phase difference detection pixel 52B.

In the array example shown in FIG. 10, each phase difference detection pixel 52A in the phase difference pixel line in the first row in the block and each phase difference detection pixel 52B disposed at a three-pixel interval with respect to each phase difference detection pixel 52A in the downward direction form a pixel pair P1.

Further, each phase difference detection pixel 52A in the phase difference pixel line in the fourth row in the block and each phase difference detection pixel 52B disposed at a three-pixel interval with respect to each phase difference detection pixel 52A in the upward direction form a pixel pair P2.

Further, each phase difference detection pixel 52A in the phase difference pixel line in the first row in the block and each phase difference detection pixel 52B disposed at a one-pixel interval with respect to each phase difference detection pixel 52A in the downward direction form a pixel pair P3.

In addition, each phase difference detection pixel 52A in the phase difference pixel line in the fourth row in the block and each phase difference detection pixel 52B disposed at a one-pixel interval with respect to each phase difference detection pixel 52A in the upward direction form a pixel pair P4.

(Third Modification Example of Array)

Figure 11:
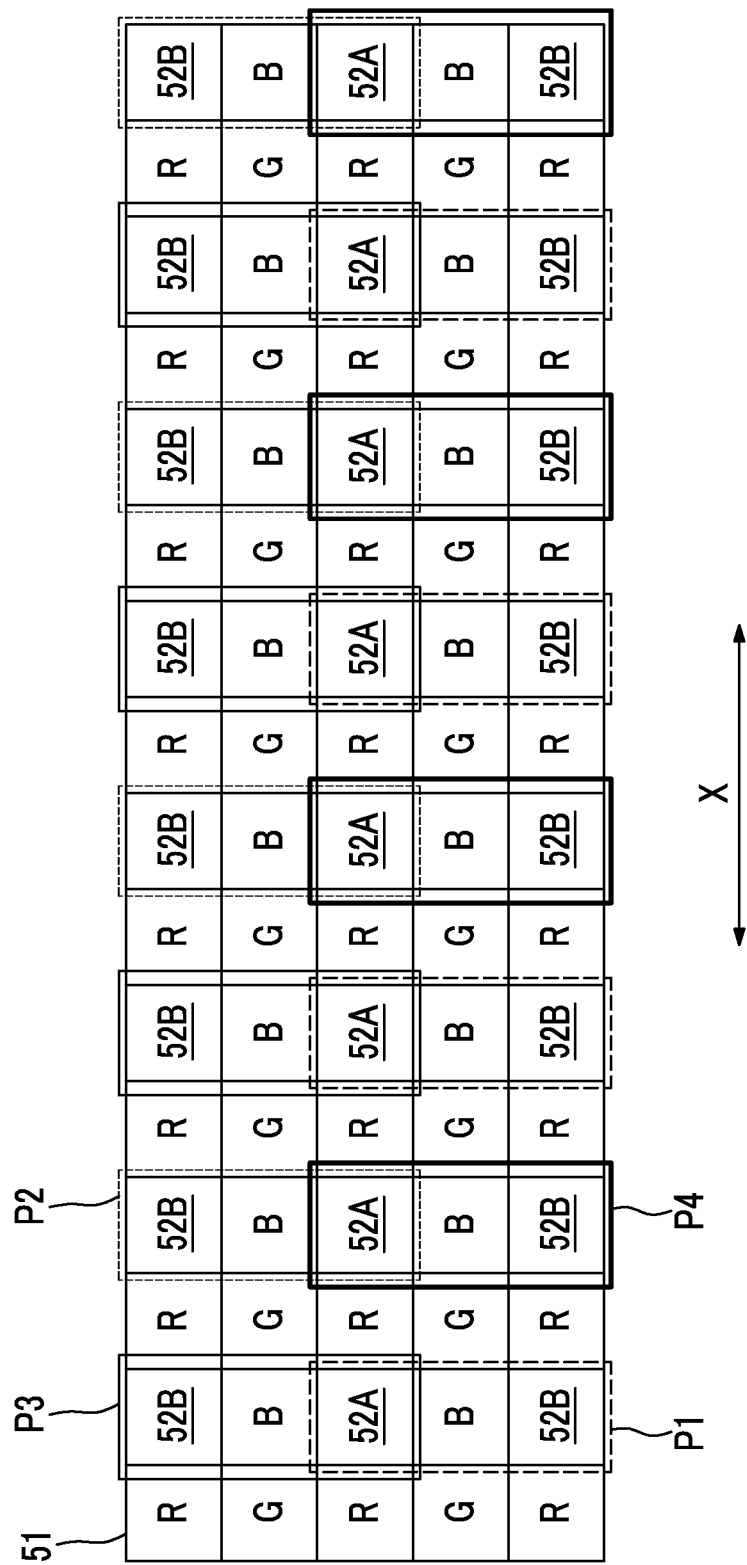
FIG. 11 is a diagram illustrating a modification example of the array of the phase difference detection pixels 52A and 52B which are positioned at the AF area 53 of the solid-state imaging element 5 shown in FIG. 1.

FIG. 11 is a diagram illustrating a modification example of the array of the phase difference detection pixels 52A and 52B which are positioned at the AF area 53 of the solid-state imaging element 5 shown in FIG. 1.

In the array example shown in FIG. 11, two phase difference pixel lines that include plural phase difference detection pixels 52B arranged in the row direction X, and one phase difference pixel line that includes plural phase difference detection pixels 52A arranged in the row direction X are provided in the AF area 53, and reliability determination is performed using the three phase difference pixel lines as one block.

In the array example shown in FIG. 11, each phase difference detection pixel 52A disposed in an odd column among the phase difference detection pixels 52A in the phase difference pixel line in the second row in the block and each phase difference detection pixel 52B disposed at a one-pixel interval with respect to each phase difference detection pixel 52A in the downward direction form a pixel pair P1.

Each phase difference detection pixel 52A disposed in an even column among the phase difference detection pixels 52A in the phase difference pixel line in the second row in the block and each phase difference detection pixel 52B disposed at a one-pixel interval with respect to each phase difference detection pixel 52A in the upward direction form a pixel pair P2.

Further, each phase difference detection pixel 52A disposed in an odd column among the phase difference detection pixels 52A in the phase difference pixel line in the second row in the block and each phase difference detection pixel 52B disposed at a one-pixel interval with respect to each phase difference detection pixel 52A in the upward direction form a pixel pair P3.

In addition, each phase difference detection pixel 52A disposed in an even column among the phase difference detection pixels 52A in the phase difference pixel line in the second row in the block and each phase difference detection pixel 52B disposed at a one-pixel interval with respect to each phase difference detection pixel 52A in the downward direction form a pixel pair P4.

According to the array example shown in FIG. 11, since the reliability determination is performed using three phase difference pixel lines as one block, it is possible to reduce the number of phase difference pixel lines used for the reliability determination compared with that in the array examples of FIGS. 9 and 10.

(Fourth Modification Example of Array)

Figure 12:
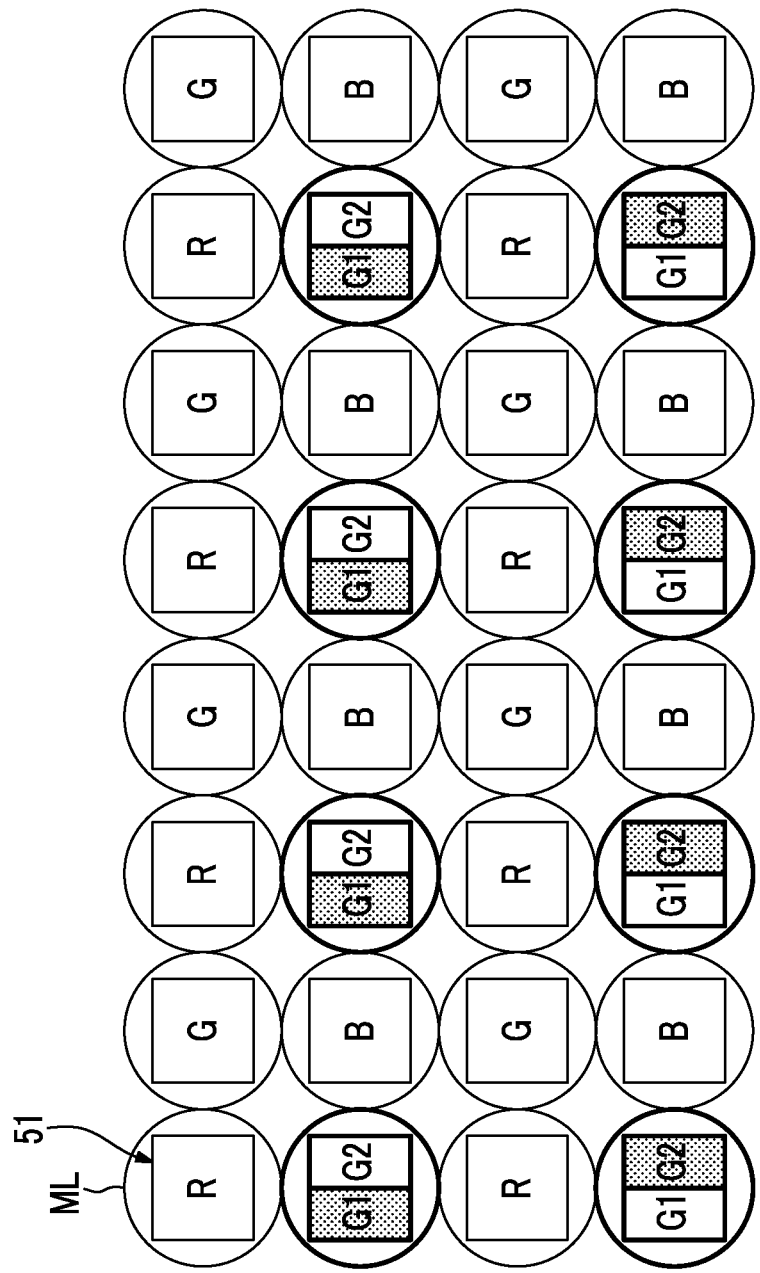
FIG. 12 is a diagram illustrating a modification example of the array of the phase difference detection pixels 52A and 52B which are positioned at the AF area 53 of the solid-state imaging element 5 shown in FIG. 1.

FIG. 12 is a diagram illustrating a modification example of the configuration of the AF area 53 of the solid-state imaging element 5 shown in FIG. 1.

In the array example shown in FIG. 12, a photoelectric conversion portion of each of some G pixels 51 disposed in the AF area 53 is divided into two parts, in which the left part ("G1" pixel) among the two-divided parts of the photoelectric conversion portion is set as the phase difference detection pixel 52A, and the right part ("G2" pixel) among the two-divided pixels is set as the phase difference detection pixel 52B.

One micro lens 51 is provided in each pixel 51, and one micro lens 51 is also provided over the phase difference detection pixel 52A and the phase difference detection pixel 52B obtained by dividing the photoelectric conversion portion of one pixel 51 into two parts.

Thus, a configuration in which the phase difference detection pixel 52A receives a beam that passes through a half of a pupil region of the imaging lens 1, and the phase difference detection pixel 52B receives a beam that passes through the remaining half of the pupil region of the imaging lens 1 is obtained.

In this array example, two phase difference pixel lines where the pixels 51 that include the phase difference detection pixel 52A and the phase difference detection pixel 52B are arranged in the row direction X are provided in the column direction Y, in the AF area 53, and the reliability determination is performed using the two phase difference pixel lines as one block. In the block, the micro lenses ML disposed at the same position in the row direction X are all disposed at such close positions as to receive a beam from the same subject.

In the array example shown in FIG. 12, each phase difference detection pixel 52A (shaded pixel in the figure) in the phase difference pixel line in the first row in the block and the phase difference detection pixel 52B (shaded pixel in the figure) in the phase difference pixel line in the second row disposed on a diagonally lower right side with respect to each phase difference detection pixel 52A are set as a pixel pair P1.

Further, each phase difference detection pixel 52A (non-shaded pixel in the figure) in the phase difference pixel line in the second row in the block and the phase difference detection pixel 52B (non-shaded pixel in the figure) in the phase difference pixel line in the first row disposed on a diagonally upper right side with respect to each phase difference detection pixel 52A are set as a pixel pair P2.

Further, each phase difference detection pixel 52A in the phase difference pixel line in the first row in the block and the phase difference detection pixel 52B rightward adjacent to each phase difference detection pixel 52A are set as a pixel pair P3.

In addition, each phase difference detection pixel 52A in the phase difference pixel line in the second row in the block and the phase difference detection pixel 52B rightward adjacent to each phase difference detection pixel 52A are set as a pixel pair P4.

In the array shown in FIG. 12, in a case where the pixel 51 divided into the phase difference detection pixel 52A and the phase difference detection pixel 52B is used as an imaging pixel, a signal obtained by adding a detection signal of the phase difference detection pixel 52A to a detection signal of the phase difference detection pixel 52B may be considered as a signal output from the pixel 51.

Further, in the array shown in FIG. 12, a configuration in which the entire pixels 51, instead of some G pixels 51, are divided into two parts may be used. In this case, it is possible to change pixel pairs used for the reliability determination according to colors of subjects, to thereby perform the phase difference AF with high accuracy.

In addition, in the configuration in which the entire pixels 51 are divided into two parts, it is also possible to perform the reliability determination for each color, and to perform the phase difference AF using phase difference detection pixels of colors for which high reliability is obtained, and thus, it is possible to increase a possibility that the phase difference AF is performed, or to enhance the accuracy of the phase difference AF.

According to the array example shown in FIG. 12, since a configuration in which the phase difference detection pixel 52A and the phase difference detection pixel 52B are provided under one micro lens ML is used, it is possible to increase the number of imaging pixels, compared with a configuration in which the micro lens ML is individually provided for the phase difference detection pixel 52A and the phase difference detection pixel 52B.

Further, in imaging, since signals from the phase difference detection pixel 52A and the phase difference detection pixel 52B disposed at the approximately the same position are added to obtain a signal corresponding to one pixel, a pixel interpolation process is not necessary, to thereby make it possible to enhance the quality of a captured image.

In this description, an example in which the digital camera is used as the imaging device is shown, but hereinafter, an embodiment in which a smart phone with a camera is used as the imaging device will be described.

Figure 13:
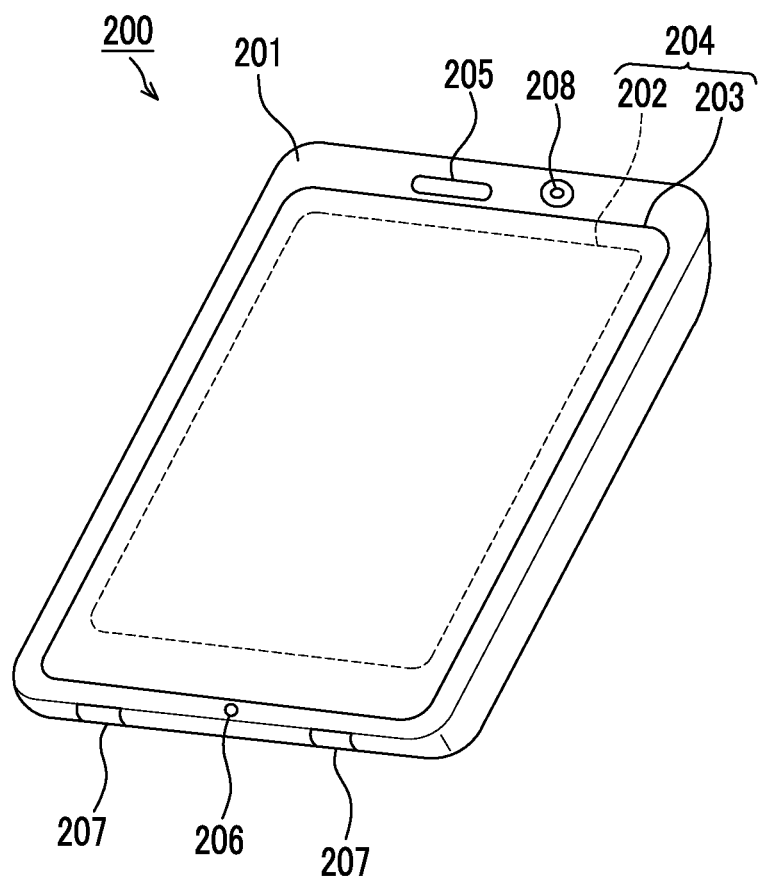
FIG. 13 is a diagram illustrating a smart phone which is an imaging device.

FIG. 13 is a diagram illustrating an appearance of a smart phone 200 which is an embodiment of the imaging device of the invention. The smart phone 200 shown in FIG. 13 includes a flat housing 201, and is provided with a display input unit 204 that is disposed on one surface of the housing 201 and includes a display panel 202 which is a display unit and an operation panel 203 which is an input unit, in which the display panel and the operation panel are integrally formed. Further, in the housing 201, a speaker 205, a microphone 206, an operation unit 207, and a camera unit 208 are provided. The configuration of the housing 201 is not limited thereto, and for example, a configuration in which the display unit and the input unit are independently provided may be employed, or a configuration in which a folding structure or a slide mechanism is provided may be employed.

Figure 14:
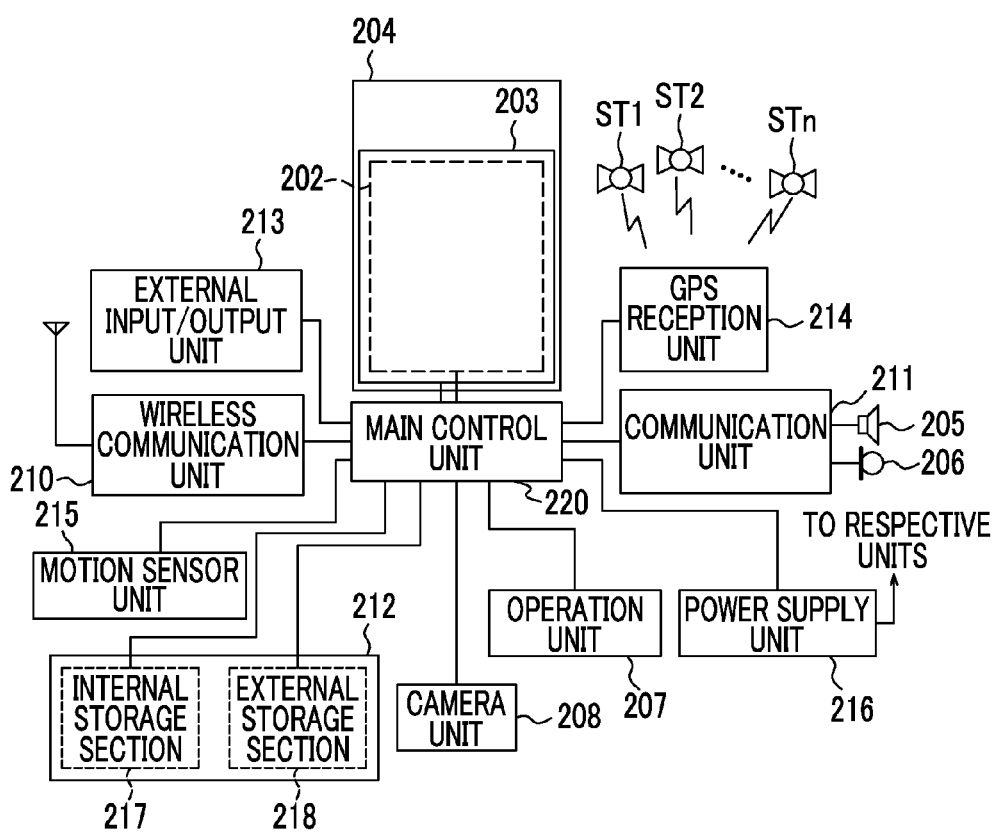
FIG. 14 is an internal block diagram of the smart phone shown in FIG. 13.

FIG. 14 is a block diagram illustrating a configuration of the smart phone 200 shown in FIG. 13. As shown in FIG. 13, as main components of the smart phone, a wireless communication unit 210, the display input unit 204, a communication unit 211, the operation unit 207, the camera unit 208, a storage unit 212, and an external input/output unit 213, a global positioning system (GPS) receiving unit 214, a motion sensor 215, a power source 216, and a main control unit 220 are provided. Further, as main functions of the smart phone 200, a wireless communication function for performing mobile wireless communication through a base station BS (not shown) and a mobile communication network NW (not shown) is provided.

The wireless communication unit 210 performs wireless communication with the base station BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (still image and moving image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device that is mounted so that an image displayed on a display surface of the display panel 202 can be visually recognized and detects one or plural coordinates operated by a user's finger or a stylus. If the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 13, the display panel 202 and the operation panel 203 of the smart phone 200 shown as an example of the imaging device of the invention are integrated to form the display input unit 204, in which the operation panel 203 is arranged to completely cover the display panel 202.

In a case where such an arrangement is employed, the operation panel 203 may have a function of detecting a user operation even in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an inductive coupling type, an electromagnetic capacitance type, or the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 13, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 13, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module card (SIM) or a user identity module card (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, a personal computer connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a still image or a moving image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a software key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1.

The captured image data generated by the camera unit 208 may be recorded in the storage unit 212, or may be output through the input/output unit 213 or the wireless communication unit 210.

In the smart phone 200 shown in FIG. 13, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203.

Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor 215, or the like may be added to the image data on a still image or a moving image, and the result may be recorded in the storage unit 212, or may be output through the input/output unit 213 or the wireless communication unit 210.

In the smart phone 200 with the above-described configuration, similarly, by using the solid-state imaging element 5 as the imaging element of the camera unit 208, and by performing the processes shown in FIGS. 5 to 7 in the main control unit 220, it is possible to enhance imaging quality in the consecutive photographing mode.

As described above, this specification discloses the following content.

An imaging device includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams. The imaging device includes: a focusing control unit that performs either one of a focusing control based on a phase difference AF method using a result of a correlation operation between a detection signal of the first signal detection unit and a detection signal of the second signal detection unit or a focusing control based on a contrast AF method using contrast of a captured image captured by the imaging element. In a mode where the imaging is consecutively performed by the imaging element a plurality of times, the focusing control unit performs, in a case where a reliability of the focusing control based on the phase difference AF method determined based on the result of the correlation operation between the detection signal of the first signal detection unit and the detection signal of the second signal detection unit read from the imaging element at an arbitrary timing is equal to or lower than a first threshold value, the focusing control based on the contrast AF method as a focusing control in the imaging to be performed after the arbitrary timing.

According to this configuration, in a case where the reliability of the focusing control based on the phase difference AF method based on the correlation operation result is equal to or lower than the first threshold value, the focusing control based on the contrast AF method is performed. Thus, it is possible to prevent a focusing error as the reliability of the focusing control based on the phase difference AF method or deterioration in focusing accuracy, to thereby enhance imaging quality.

In the above imaging device, the focusing control unit may perform, after performing the focusing control based on the contrast AF method as the focusing control in the imaging to be performed after the arbitrary timing, the focusing control based on the contrast AF method in each time of imaging until the remaining imaging among the plurality of times of imaging is terminated.

According to this configuration, after the reliability of the focusing control based on the phase difference AF method based on the correlation operation result is equal to or lower than the first threshold value, until plural times of imaging are terminated, the focusing control based on the contrast AF method is performed. Thus, it is possible to prevent lowering in focusing accuracy due to a focusing error, to thereby enhance imaging quality.

In the above imaging device, the focusing control unit may determine and store, in a case where the reliability based on the result of the correlation operation is equal to or lower than the first threshold value, a factor of the reliability becoming equal to or lower than the first threshold value using the detection signals which are targets of the correlation operation, and in a case where the reliability is higher than the first threshold value after the focusing control based on the contrast AF method is performed, may perform the focusing control based on the phase difference AF method in imaging to be performed next time if the factor is not based on a frequency of a subject image and may perform the focusing control based on the contrast AF method in the imaging to be performed next time if the factor is based on the frequency of the subject image.

According to this configuration, it is possible to prevent the focusing control based on the contrast AF method and the focusing control based on the phase difference AF method from being frequently switched.

The above imaging device may further include: an information generation unit that generates, based on correlation operation results between detection signals from a first signal detection unit group and detections signals from a second signal detection unit group, output from a first pair of the first signal detection unit group including the plurality of first signal detection units arranged along a phase difference detection direction in the first signal detection unit and the second signal detection unit and a signal detection unit group including the plurality of second signal detection units disposed at the same distance in the same direction with respect to the respective signal detection units of the first signal detection unit group, and based on correlation operation results between detection signals from the first signal detection unit group and detections signals from the second signal detection unit group, output from a second pair of the second signal detection unit group including the plurality of first signal detection units arranged at the same distance in the same direction with respect to the respective signal detection units of the first signal detection unit group and arranged along the detection direction and a signal detection unit group including the plurality of second signal detection units arranged at the same distance in a direction different from the same direction with respect to the respective signal detection units of the second signal detection unit group, a reliability determination value for determining the reliability, in which the focusing control unit determines the factor according to the size of the reliability determination value.

According to this configuration, it is possible to accurately determine a factor of the focusing control based on the contrast AF method being performed.

In the imaging device, the imaging element may include a plurality of signal detection unit pairs of the first signal detection units and the second signal detection units arranged in a direction that intersects the detection direction with respect to the first signal detection units, the plurality of signal detection unit pairs may include a first signal detection unit pair and a second signal detection unit pair in which positional relationships between the first signal detection units and the second signal detection units are reverse to each other, the imaging element may include a plurality of pair lines in which the first signal detection unit pair and the second signal detection unit pair are alternately arranged in the detection direction, and the information generation unit may set the first signal detection unit pair included in an arbitrary pair line as the first pair and may set the second signal detection unit pair included in the arbitrary pair line as the second pair, or may set, in a state where the signal detection units included in the arbitrary pair line are divided into two groups including the signal detection units disposed at the same position in a direction orthogonal to the detection direction, one group as the first pair and may set the other group as the second pair, to calculate the reliability determination value.

According to this configuration, it is possible to accurately determine a factor of the focusing control based on the contrast AF method being performed.

The above imaging device may further include: an imaging control unit that performs, in a case where an F-number of the imaging optical system when each of the plurality of times of imaging is performed is greater than a second threshold value, virtual imaging for acquiring detection signals from the first signal detection unit and the second signal detection unit between an arbitrary time of imaging among the plurality of times of imaging and imaging next to the arbitrary time of imaging in a state where the F-number is equal to or smaller than the second threshold value, in which the focusing control unit may perform, in a case where the reliability calculated based on the result of the correlation operation between the detection signal of the first signal detection unit and the detection signal of the second signal detection unit read from the imaging element by the virtual imaging is equal to or lower than a first threshold value, the focusing control based on the contrast AF method as the focusing control in the imaging to be performed after the arbitrary timing.

According to this configuration, it is possible to determine the reliability with high accuracy.

In the imaging device, the focusing control unit may perform, in a case where the reliabilities are consecutively equal to or lower than the first threshold value a plurality of times after initial imaging is terminated, the focusing control based on the contrast AF method in the imaging to be performed next time.

According to this configuration, it is possible to increase a probability that the focusing control based on the phase difference AF method is performed, and to perform the focusing control at high speed and with low power consumption.

A focusing control method is a focusing control method in an imaging device that includes an imaging element that images a subject through an imaging optical system, in which the imaging element includes a first signal detection unit that detects a signal based on one beam among a pair of beams that passes through different portions in a pupil region of the imaging optical system, and a second signal detection unit that detects a signal based on the other beam among the pair of beams. The focusing control method includes performing, in a mode where the imaging is consecutively performed by the imaging element a plurality of times, in a case where a reliability of the focusing control based on the phase difference AF method, which uses the result of the correlation operation, determined based on the result of the correlation operation between the detection signal of the first signal detection unit and the detection signal of the second signal detection unit read from the imaging element at an arbitrary timing is equal to or lower than a first threshold value, the focusing control based on the contrast AF method using contrast of a captured image captured by the imaging element as a focusing control in the imaging to be performed after the arbitrary timing.

INDUSTRIAL APPLICABILITY

The present invention is applied in a digital camera or the like to provide high convenience and effectiveness.

EXPLANATION OF REFERENCES

1: imaging lens
2: diaphragm
5: solid-state imaging element
11: system control unit (focus control unit, imaging control unit)
18: contrast AF processing unit
19: phase difference AF processing unit (information generation unit)
50: light receiving surface
51: pixel
52, 52A, 52: phase difference detection pixel
53: AF area
P1, P2, P3, P4: pixel pair

What is claimed is:
1. An imaging device that includes an imaging element that images a subject through an imaging optical system, the imaging element including a first signal detection unit that detects a signal based on one beam among a pair of beams that passes through different portions in a pupil region of the imaging optical system, and a second signal detection unit that detects a signal based on the other beam among the pair of beams, and the imaging device comprising:
   a focusing control unit that performs either one of a focusing control based on a phase difference AF method using a result of a correlation operation between a detection signal of the first signal detection unit and a detection signal of the second signal detection unit or a focusing control based on a contrast AF method using contrast of a captured image captured by the imaging element,
   wherein in a mode where the imaging is consecutively performed by the imaging element a plurality of times, the focusing control unit performs, in a case where a reliability of the focusing control based on the phase difference AF method determined based on the result of the correlation operation between the detection signal of the first signal detection unit and the detection signal of the second signal detection unit read from the imaging element at an arbitrary timing is equal to or lower than a first threshold value, the focusing control based on the contrast AF method as a focusing control in the imaging to be performed after the arbitrary timing,
   wherein the focusing control unit determines and stores, in a case where the reliability based on the result of the correlation operation is equal to or lower than the first threshold value, a factor of the reliability becoming equal to or lower than the first threshold value using the detection signals which are targets of the correlation operation, and in a case where the reliability is higher than the first threshold value after the focusing control based on the contrast AF method is performed, performs the focusing control based on the phase difference AF method in imaging to be performed next time if the factor is not based on a frequency of a subject image and performs the focusing control based on the contrast AF method in the imaging to be performed next time if the factor is based on the frequency of the subject image.

2. The imaging device according to claim 1, further comprising:
an information generation unit that generates, based on correlation operation results between detection signals from a first signal detection unit group and detections signals from a second signal detection unit group, output from a first pair of the first signal detection unit group including the plurality of first signal detection units arranged along a phase difference detection direction in the first signal detection unit and the second signal detection unit and a signal detection unit group including the plurality of second signal detection units disposed at the same distance in the same direction with respect to the respective signal detection units of the first signal detection unit group, and based on correlation operation results between detection signals from the first signal detection unit group and detection signals from the second signal detection unit group, output from a second pair of the second signal detection unit group including the plurality of first signal detection units arranged at the same distance in the same direction with respect to the respective signal detection units of the first signal detection unit group and arranged along the detection direction and a signal detection unit group including the plurality of second signal detection units arranged at the same distance in a direction different from the same direction with respect to the respective signal detection units of the second signal detection unit group, a reliability determination value for determining the reliability,
wherein the focusing control unit determines the factor according to the size of the reliability determination value.

3. The imaging device according to claim 2,
wherein the imaging element includes a plurality of signal detection unit pairs of the first signal detection units and the second signal detection units arranged in a direction that intersects the detection direction with respect to the first signal detection units,
wherein the plurality of signal detection unit pairs include a first signal detection unit pair and a second signal detection unit pair in which positional relationships between the first signal detection units and the second signal detection units are reverse to each other,
wherein the imaging element includes a plurality of pair lines in which the first signal detection unit pair and the second signal detection unit pair are alternately arranged in the detection direction, and
wherein the information generation unit sets the first signal detection unit pair included in an arbitrary pair line as the first pair and sets the second signal detection unit pair included in the arbitrary pair line as the second pair, or sets, in a state where the signal detection units included in the arbitrary pair line are divided into two groups including the signal detection units disposed at the same position in a direction orthogonal to the detection direction, one group as the first pair and sets the other group as the second pair, to calculate the reliability determination value.

4. The imaging device according to claim 1, further comprising:
an imaging control unit that performs, in a case where an F-number of the imaging optical system when each of the plurality of times of imaging is performed is greater than a second threshold value, virtual imaging for acquiring detection signals from the first signal detection unit and the second signal detection unit between an arbitrary time of imaging among the plurality of times of imaging and imaging next to the arbitrary time of imaging in a state where the F-number is equal to or smaller than the second threshold value,
wherein the focusing control unit performs, in a case where the reliability calculated based on the result of the correlation operation between the detection signal of the first signal detection unit and the detection signal of the second signal detection unit read from the imaging element by the virtual imaging is equal to or lower than a first threshold value, the focusing control based on the contrast AF method as the focusing control in the imaging to be performed after the arbitrary timing.

5. The imaging device according to claim 2, further comprising:
an imaging control unit that performs, in a case where an F-number of the imaging optical system when each of the plurality of times of imaging is performed is greater than a second threshold value, virtual imaging for acquiring detection signals from the first signal detection unit and the second signal detection unit between an arbitrary time of imaging among the plurality of times of imaging and imaging next to the arbitrary time of imaging in a state where the F-number is equal to or smaller than the second threshold value,
wherein the focusing control unit performs, in a case where the reliability calculated based on the result of the correlation operation between the detection signal of the first signal detection unit and the detection signal of the second signal detection unit read from the imaging element by the virtual imaging is equal to or lower than a first threshold value, the focusing control based on the contrast AF method as the focusing control in the imaging to be performed after the arbitrary timing.

6. The imaging device according to claim 3, further comprising:
an imaging control unit that performs, in a case where an F-number of the imaging optical system when each of the plurality of times of imaging is performed is greater than a second threshold value, virtual imaging for acquiring detection signals from the first signal detection unit and the second signal detection unit between an arbitrary time of imaging among the plurality of times of imaging and imaging next to the arbitrary time of imaging in a state where the F-number is equal to or smaller than the second threshold value,
wherein the focusing control unit performs, in a case where the reliability calculated based on the result of the correlation operation between the detection signal of the first signal detection unit and the detection signal of the second signal detection unit read from the imaging element by the virtual imaging is equal to or lower than a first threshold value, the focusing control based on the contrast AF method as the focusing control in the imaging to be performed after the arbitrary timing.

7. The imaging device according to claim 1,
wherein the focusing control unit performs, in a case where the reliabilities are equal to or lower than the first threshold value in a consecutive manner a plurality of times after initial imaging is terminated, the focusing control based on the contrast AF method in the imaging to be performed next time.

8. The imaging device according to claim 2,
wherein the focusing control unit performs, in a case where the reliabilities are equal to or lower than the first threshold value in a consecutive manner a plurality of times after initial imaging is terminated, the focusing control based on the contrast AF method in the imaging to be performed next time.

9. The imaging device according to claim 3,
wherein the focusing control unit performs, in a case where the reliabilities are equal to or lower than the first threshold value in a consecutive manner a plurality of times after initial imaging is terminated, the focusing control based on the contrast AF method in the imaging to be performed next time.

10. The imaging device according to claim 4,
wherein the focusing control unit performs, in a case where the reliabilities are equal to or lower than the first threshold value in a consecutive manner a plurality of times after initial imaging is terminated, the focusing control based on the contrast AF method in the imaging to be performed next time.

11. The imaging device according to claim 5,
wherein the focusing control unit performs, in a case where the reliabilities are equal to or lower than the first threshold value in a consecutive manner a plurality of times after initial imaging is terminated, the focusing control based on the contrast AF method in the imaging to be performed next time.

12. The imaging device according to claim 6,
wherein the focusing control unit performs, in a case where the reliabilities are equal to or lower than the first threshold value in a consecutive manner a plurality of times after initial imaging is terminated, the focusing control based on the contrast AF method in the imaging to be performed next time.

13. A focusing control method in an imaging device according to claim 1 that includes an imaging element that images a subject through an imaging optical system, the imaging element including a first signal detection unit that detects a signal based on one beam among a pair of beams that passes through different portions in a pupil region of the imaging optical system, and a second signal detection unit that detects a signal based on the other beam among the pair of beams, and the focusing control method comprising:

performing, in a mode where the imaging is consecutively performed by the imaging element a plurality of times, in a case where a reliability of the focusing control based on the phase difference AF method, which uses the result of the correlation operation, determined based on the result of the correlation operation between the detection signal of the first signal detection unit and the detection signal of the second signal detection unit read from the imaging element at an arbitrary timing is equal to or lower than a first threshold value, the focusing control based on the contrast AF method using contrast of a captured image captured by the imaging element as a focusing control in the imaging to be performed after the arbitrary timing determining and storing, in a case where the reliability based on the result of the correlation operation is equal to or lower than the first threshold value, a factor of the reliability becoming equal to or lower than the first threshold value using the detection signals which are targets of the correlation operation, and in a case where the reliability is higher than the first threshold value after the focusing control based on the contrast AF method is performed, performing the focusing control based on the phase difference AF method in imaging to be performed next time if the factor is not based on a frequency of a subject image, and performing the focusing control based on the contrast AF method in the imaging to be performed next time if the factor is based on the frequency of the subject image.

\* \* \* \* \*